A. L. HALEY.
METHOD OF SAWING TAPER LOGS.
APPLICATION FILED MAR. 31, 1921.
1,393,529.
Patented Oct. 11, 1921.
3 SHEETS—SHEET 1.
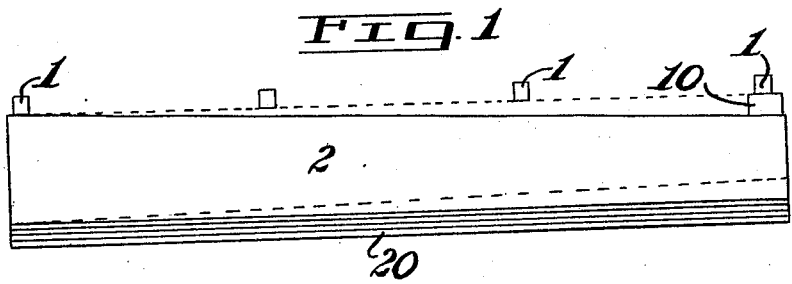
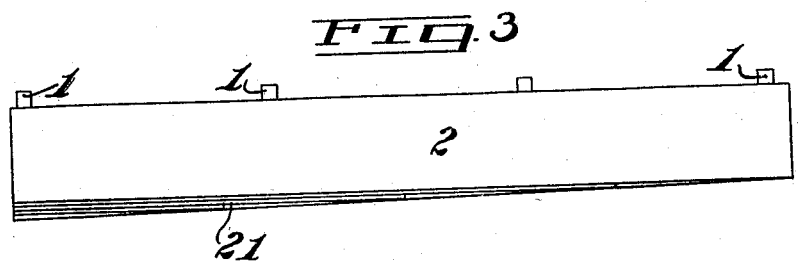
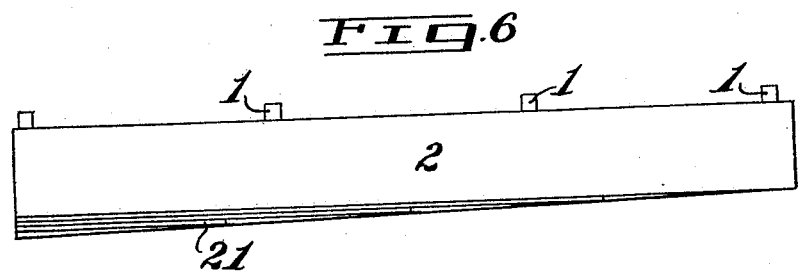
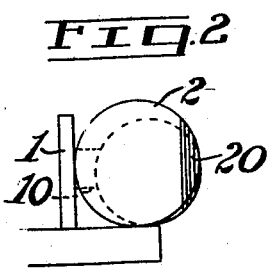
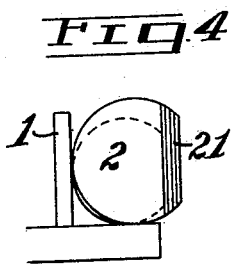
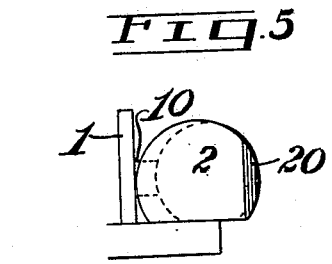
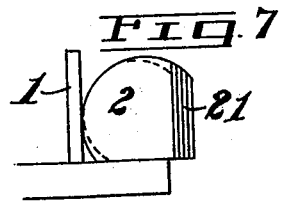
INVENTOR
Arthur L. Haley
BY
H. L. & S. L. Reynolds
ATTORNEYS

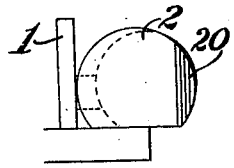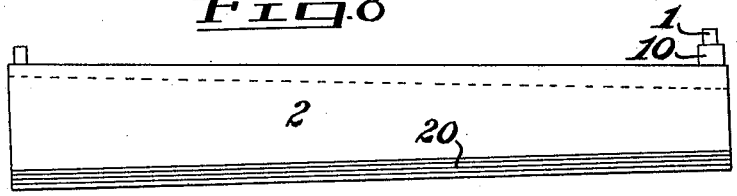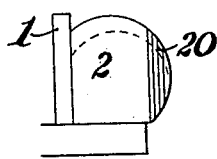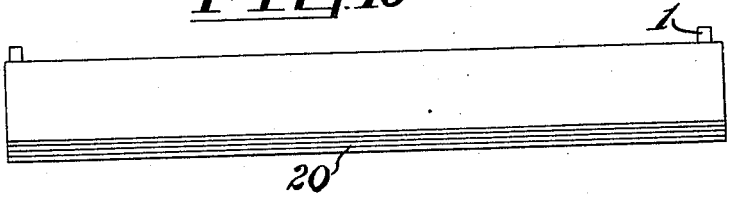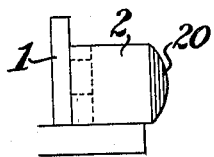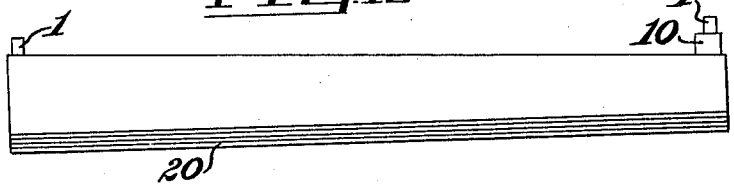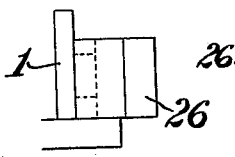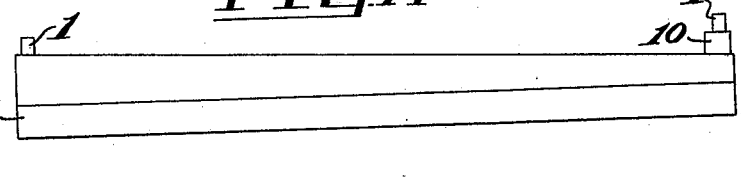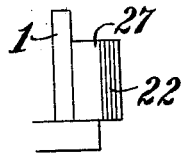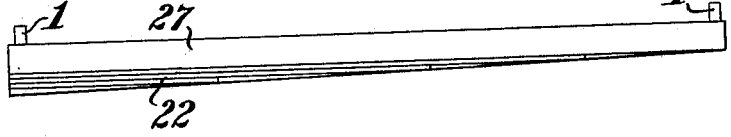

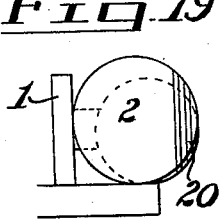
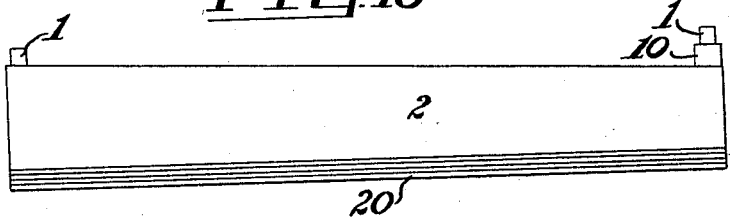
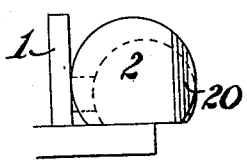
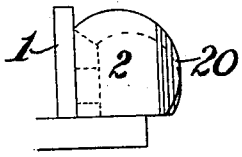
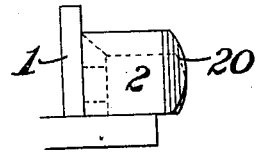
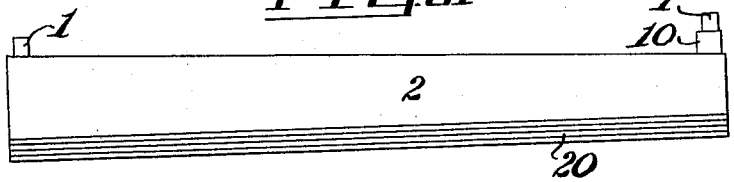
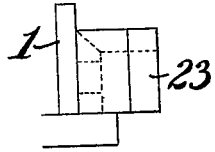
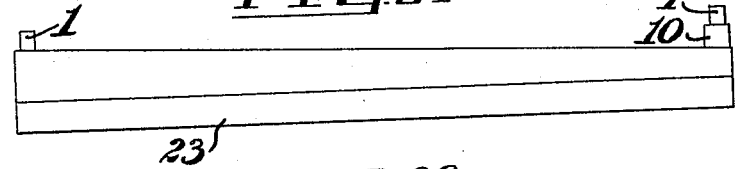
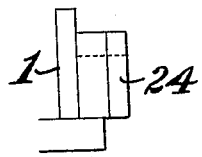
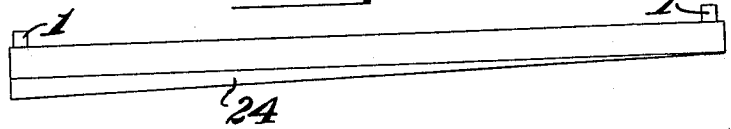
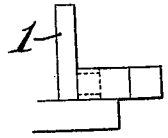
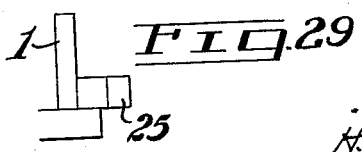

UNITED STATES PATENT OFFICE.

ARTHUR L. HALEY, OF SEATTLE, WASHINGTON.

METHOD OF SAWING TAPER LOGS.

1,393,529.   Specification of Letters Patent.   Patented Oct. 11, 1921.

Application filed March 31, 1921. Serial No. 457,409.

*To all whom it may concern:*

Be it known that I, ARTHUR L. HALEY, a citizen of the United States of America, and resident of the city of Seattle, in the county of King and State of Washington, have invented certain new and useful Improvements in Methods of Sawing Taper Logs, of which the following is a specification.

My invention consists of a method or plan for sawing tapered logs whereby a larger percentage of the contents of the log is converted into merchantable lumber than is secured by the usual method of sawing a log and one in which also the lumber secured is of a higher grade than is usually produced.

The object of my invention is therefore to produce an increase in both the quantity and the quality of the lumber produced from logs having a decided taper.

The advantages and novel features of my improved method of sawing tapered logs will be hereinafter described and then defined by the claims terminating this specification.

In the accompanying drawings I have shown the successive steps employed in carrying out my method, the same illustrating certain modifications in the manner of applying it to fit varying conditions and requirements of production.

Figure 1 is a top or plan view of a log as mounted upon a carriage and the manner of making the first cuts thereon, the smaller end being blocked out from the carriage knees.

Fig. 2 is an end view of the condition shown in Fig. 1, and like Fig. 1 indicates the manner of making the first cuts thereon.

Fig. 3 shows the manner in which the log is next dropped back against the knees at its smaller end and the short boards cut therefrom.

Fig. 4 is an end view of the log and the cuts taken therefrom under the conditions shown in Fig. 3.

Figs. 5, 8 and 9 are, respectively, end and top views showing the manner of placing the log upon the carriage and cutting therefrom in the next step of the process, that is, with the log turned 90°.

Figs. 6 and 7 are, respectively, top and end views showing the cutting of the boards from the same side of the log whereby this face is made parallel with the opposite face.

Figs. 10 and 11 are, respectively, top and plan views showing the manner of cutting the sap wood from the third side of the log.

Figs. 12 and 13 are, respectively, top and end views showing the manner of cutting the fourth side of the log.

Figs. 14 and 15 as well as 16 and 17, are top and end views illustrating the manner of cutting up the stick after two opposite sides have been made parallel and the other two faced but not made parallel, whereby the short boards cut from the wedge section may be cut from heart stock.

Figs. 18 and 19 are, respectively, top and ends views showing the first steps in a manner of placing and cutting a log under a slightly modified plan.

Figs. 20 and 21 are, respectively, end and top views of the placing and cutting of the log in the next step.

Figs. 22 and 23 show by ends views of the log, the next following steps, which result in forming a squared timber of larger size at one end than at the other.

Figs. 24 and 25 are, respectively, top and end views of the next step in the process whereby a stick of large size is cut from the heart section of the log.

Figs. 26 and 27 are, respectively, top and end views showing the manner of cutting up the wedge section into short boards.

Figs. 28 and 29 illustrate by end views the manner of cutting up the remainder of the stock.

The various figures of drawings show, some in top view and some in end view, the various steps of the method as applied under varied conditions and to secure varied grades and kinds of lumber. What these varied steps are will be specifically stated in the following description.

In the more commonly employed method of sawing lumber wherein the first or slabbing cuts are taken from the log parallel with the axis of the log, there is a heavy waste in tapering slabs, which can only be used to a very limited extent in making by-products or for fuel.

The first principle of my method and the first steps in carrying it out, consists in making the first or outside cuts from a log in planes which are parallel with the sides of the log from which they are cut, this style of cutting being carried on until the sides are faced up and, under some conditions until the central axis of the log is reached at its smaller end.

Together with the above is employed the principle of cutting a single wedge such as is required to parallel opposite sides of the log, from the inner or heart wood. This may be cut immediately inward of the cuts which face up the side, at the core or central axis of the log, or at any intermediate point. Such wedge may also be cut up in any manner desired, as by cutting into a series of short boards having parallel or substantially parallel sides.

In all the drawings 1 represents the knees or standards of a saw carriage and 10 blocks or equivalent means which may be employed to set out the smaller end of the log. In case the log carriage is equipped with means for advancing one or more of the knees ahead of the others, inserted blocks would not be necessary.

The log when first put upon the carriage would be placed as shown in Figs. 1 and 2, with its small end held out so as to bring the outer face of the log parallel with the line of travel of the carriage. The first cuts produce either a slab which is of uniform thickness but varying somewhat in width, or a series of boards which vary but little in width at opposite ends. This part of the log is shown at 20 as a series of boards.

The step next following this may vary in carrying out my process. As illustrated in Figs. 3 and 4, the block 10 which holds out the small end of the log has been removed and the small end of the log brought back until its back side, that is the side which is away from the saw, is parallel with the direction of travel of the carriage.

In this position wedge 21 which must be removed to make the front and back sides parallel may be removed, usually as a series of boards, which boards each have a tapered end which, when cut off, leaves a short board but one of full width and one which may be put to good use.

Instead of cutting the wedge from the timber lying just within the boards 20 which are cut from the sap wood, the log may be cut on lines parallel with the boards 20 until the heart of the log is reached at its smaller end, then cutting the wedge from the heart which often contains many small pin knots. Such cutting of the boards is parallel with the grain of the timber as it was formed in the growth of the tree and is thus clearer and straighter grained than if the body of the log were sawed parallel with the axis of the log. Furthermore, practically all of the pin knots will be in the heart wedge which is left. This wedge may at times be decayed, in which case sawing parallel with the outer face will produce more sound boards and concentrate the decayed core in said wedge. Such plan of sawing is shown in Figs. 16 and 17 in which the section 22 represents a heart wedge.

After facing one side by first sawing parallel with the edge of the log, the block 10 may be removed and the log located with its inner face, or that away from the saw, parallel with the line of travel of the carriage and the wedge 21 removed, thus making two opposite sides parallel, one of which is flat having been faced by the saw, and the other is of the natural rounded contour. These sides are in a sense parallel, that is, the thickness of the log perpendicular to the flat face is substantially the same throughout its length in any plane which would be made by a saw in cutting boards perpendicular to the flat face.

The next step in the sawing would ordinarily be to turn the log down upon its flat face and then dress its outer face by cutting in the manner described; that is, setting out the small end of the log so that the saw cut is parallel with the outer face of the log and while in this position cutting from the surface enough to at least square the small end, then removing the block and dropping back the small end and cutting short lengths from this face until the outer and inner faces are parallel in the sense previously defined. The balk may then be sawed into boards without further facing, if desired. It may also be faced upon one or both of the two remaining rounded sides, as is indicated in Figs. 10 to 13 inclusive.

By this plan of sawing all cuts are made parallel with one or the other natural face of the log. All boards have either exactly or approximately parallel edges. The sap is confined to a smaller percentage of the boards. When sap and heart wood are combined in one board, the sap appears as a marginal edge which may be trimmed off to form a narrow but useful strip, leaving a clear heart board of narrower width.

In the variation of the method shown in Figs. 18 to 29 inclusive, the wedge or wedges which produce the true square form has not been removed until after the log has had all four sides faced up. These figures taken in succession illustrate the successive stages of the work. The thickness of the block 10 is equal to the entire diametrical taper of the log. After the log has been cut to the form of a tapering square, or the frustum of a square pyramid, it may then be further cut by removing a cant, as 23, (Figs. 24 and 25), a wedge as 24, (Figs. 26 and 27), and than paralleling the edges of these, as shown in Figs. 28 and 29. These cants may be resawed in any desired and practical manner.

The type of sawing illustrated in Figs. 18 to 29, is especially adapted to cutting up hard woods and woods where vertical grain lumber is desired.

What I claim as my invention is:

1. The method of sawing logs which consists in sawing two adjacent sides by first cutting parallel with the respective faces of the log and then squaring the log by sawing therefrom on lines which are parallel with the opposite sides of the log.

2. The method of sawing tapered logs which consists in first cutting parallel with one face of the log until that side is faced up, then cutting from the same side parallel with the opposite side until said two sides are parallel throughout their length, then repeating the same steps upon an adjacent side, thus producing a timber having two adjacent trued faces and of approximately the same thickness throughout its length.

Signed at Seattle, King county, Washington, this 25th day of March, 1921.

ARTHUR L. HALEY.